United States Patent [19]

Okada et al.

[11] 4,000,326
[45] Dec. 28, 1976

[54] METHOD OF MANUFACTURING AN ASEPTIC SOYA BEAN CURD

[75] Inventors: Katsuto Okada, Tokyo; Katsuhiro Ogasa, Yokohama; Kunisuke Kuwahara, Tokyo, all of Japan

[73] Assignee: Morinaga Milk Industry Co., Ltd., Tokyo, Japan

[22] Filed: July 31, 1975

[21] Appl. No.: 600,789

[30] Foreign Application Priority Data

July 31, 1974 Japan .............................. 49-87078
Dec. 18, 1974 Japan ........................... 49-144413

[52] U.S. Cl. .............................. 426/126; 426/407; 426/412; 426/656; 426/106; 426/127
[51] Int. Cl.² ............................................ A23L 3/00
[58] Field of Search ............ 426/46, 399, 401, 407, 426/656, 412, 520–522, 106, 130, 322–325, 334, 634, 573, 126, 127; 260/123.5

[56] References Cited

FOREIGN PATENTS OR APPLICATIONS 85,758 1973 Japan
34,224 1973 Japan

*Primary Examiner*—R. B. Penland
*Attorney, Agent, or Firm*—Oblon, Fisher, Spivak, McClelland & Maier

[57] ABSTRACT

Packaged aseptic soya bean curd containing no bactericidal agents is manufactured by a method which comprises continuously sterilizing a soya bean juice by maintaining it at a temperature of 128° to 150° C for 1 to 6 seconds and cooling to room temperature; homogeneously mixing said sterilized soya bean juice with a sterilized coagulating agent-containing solution in an aseptic atmosphere continuously or in a pipeline; continuously filling the resulting liquid mixture into a container in an aseptic atmosphere and sealing it; and dipping said sealed container into a water tank heated to 70° to 95° C for 20 to 60 minutes in order to coagulate the mixture.

13 Claims, 2 Drawing Figures

METHOD OF MANUFACTURING AN ASEPTIC SOYA BEAN CURD

BACKGROUND OF THE INVENTION

1. Field of the Invention

The present invention relates to a method of manufacturing an aseptic soya bean curd without using a germicide.

2. Description of the Prior Art

Recently, a new coagulating agent, glucono-delta-lactone (hereinafter abbreviated as GDL) has been developed. Using this agent, new methods of manufacturing soya bean curd have also been developed. For example, a packed soya bean curd manufactured by putting soya bean juice and GDL into a bag or injection molded container, sealing the container and heating the container to coagulate the contents is now commercially available.

According to this method, a soya bean curd can be manufactured easily and on a mass production scale. The product is very portable and fairly good in its preservation qualities. Therefore, this method has given rise to a new breadth in the distribution of these products.

However, an aseptic soya bean curd which can be preserved for a long period of time cannot be manufactured by this conventional mass production manufacturing method. In the step of soaking the beans and grinding them to obtain a crude juice of the soya bean (the so-called "Go", in Japan) and then boiling the crude juice by heating and filtering it to obtain a soya bean juice, the heating is conducted generally at about 100° C for 4 to 8 minutes.

Under such heating conditions, although general bacteria can be killed, spore-forming bacteria originating from the soya bean cannot be killed. Consequently, several tens or several hundreds of spore-forming bacteria generally exist in a 1 ml sample of soya bean juice treated by such heating. These spore-forming bacteria survive to exist in the soya bean curd which is the final product. As a result, the subsequent manufacturing steps must be strictly controlled, and the product deteriorates during transportation and preservation.

Therefore, in order to obtain an aseptic soya bean milk, as in the method described in Japanese Patent Publication Gazette No. 34224/73, a soya bean protein solution (the so-called "soya bean milk") is introduced into a pipeline together with steam and heated to above 120° C.

Regarding the coagulating agent solution to be mixed with the soya bean juice, heretofore, the sterilization of the coagulating agent, for example, GDL solution, used in the manufacture of the soya bean curd has not been performed. Additionally, an indispensable requirement for producing a true aseptic soya bean curd is to prevent the secondary contamination of the soya bean milk together with the coagulating agent during the time of filling into a packaging container. When soya bean milk is filled into a conventional container, the product itself cannot actually be aseptic because the bacteria in the air are drawn therein. In any event, since the GDL solution is not itself sterilized, a conventional container is used and the soya bean milk is treated using conventional filling methods. The final product has poor stability, which would be true even if the soya bean milk could be sterilized. As a result, it is impossible to form a high quality product which can be preserved at room temperature for a long period of time.

Given the state of the art, synthetic germicides, such as $AF_2$ and the like, have been used in the products. However, recently, the toxicity of synthetic germicides, including $AF_2$, has come into question. As a result, a method of manufacturing soya bean curd which can be preserved for a long period of time without requiring the addition of a synthetic germicide is needed.

In summary, in the conventional methods of manufacturing soya bean curd packaged in a blow molded container, a true aseptic soya bean curd has not been obtained because blow molded containers cannot be made aseptic, the soya bean juice cannot be filled into the container in an aseptic atmosphere, the coagulating agent solution to be added to the soya bean juice is not aseptically treated, and the soya bean juice is not sterilized.

Improved methods of filling a soya bean juice into a container and pasteurizing a coagulating agent solution have been proposed (Japanese Patent Public Disclosure No. 85758/73). However, a true aseptic soya bean curd in a blow molded container cannot be obtained by this method because the coagulating agent solution and soya bean juice are not sterilized and because no concrete means of making the aseptic container is described. Some methods of sterilizing the soya bean juice have been proposed (Japanese Patent Publication Gazette Nos. 34224/73 and 34225/73). However, even if the soya bean juice is sterilized according to these methods, an aseptic soya bean curd in a blow molded container cannot be manufactured, since the container cannot be blow molded and the soya bean milk cannot be filled into the container in an aseptic atmosphere.

On the other hand, methods of sterilizing cow's milk and filling it into a container aseptically are widely carried out in the milk industry. However, application of the cow's milk treating steps to the manufacture of soya bean curd for producing an aseptic soya bean curd has not hitherto been tried and is considered to be impossible. That is, it is well known in the milk industry that the container filled-up with the cow's milk in an aseptic atmosphere is cooled as soon as possible after being sealed tightly. There is no technical knowledge on the concept of heating this container. Therefore, application of the steps used in the treatment of cow's milk to the manufacture of soya bean curd has not hitherto been tried since it is an indispensable requirement in the manufacturing of soya bean curd to heat the soya bean juice to which has been added a coagulating agent in order to coagulate the soya bean juice.

Moreover, mixing of two solutions in a pipeline has hitherto been widely carried out in the industrial field. Also, in the food industry methods using various pipeline mixers have been proposed ("Mixing and Stirring in Food Industry", by Kazuo Endo, published from Korin Shoin, March 10, 1963, Japan). Additionally, a method of mixing specific quantities of water with a sugar solution is described in the February issue of *Machine and Apparatus for Food*, pages 61 to 72, published in Japan (1974). However, it is sanitarily insufficient to use such mixing in a pipeline alone in the manufacture of aseptic foodstuffs. The manufacture of the desired aseptic foodstuff is not possible unless the steps before and after the mixing are carried out in an aseptic atmosphere. But, of course, in the manufacture of foodstuffs, in particular soya bean curd, it is very difficult to carry out the whole process in an aseptic atmosphere.

The utilization of a pipeline for mixing soya bean juice and a coagulant-containing solution in the manufacture of soya bean curd has not hitherto been tried. Certainly, no attempts at utilizing such a treating method for continuously manufacturing an aseptic soya been curd on a large scale have been made.

Moreover, in the manufacturing of a packaged soya bean curd in general, there are such major difficulties that the process cannot be carried out continuously in its entirety because the soya bean juice and coagulant-containing solution are poured into a tank and must be stirred for a specific length of time to ensure homogeneous mixing.

The present inventors have responded to this need for a method of manufacturing an aseptic soya bean curd packaged in a container, in which the whole process can be carried out continuously and in which the above-described defects are eliminated.

SUMMARY OF THE INVENTION

Accordingly, an object of the present invention is to provide a method of manufacturing an aseptic soya bean curd, "Tofu", packaged in a container, which is excellent in flavor and quality and which has a long shelf life at room temperature, without using any germicide by eliminating the defects of the conventional method of manufacturing soya bean curd.

Briefly, this and other objects of the present invention, as will hereinafter become clear by the ensuing discussion, have been achieved by providing a method comprising the steps of:

1. continuously sterilizing a soya bean juice by maintaining it at a temperature of 128° – 150° C for 1 – 6 seconds and cooling to room temperature;
2. continuously homogeneously mixing the sterilized soya bean juice so obtained with a sterilized coagulating agent-containing solution in an aseptic atmosphere or in a pipeline;
3. continuously filling the resulting liquid mixture into a container in an aseptic atmosphere and sealing it; and
4. dipping said sealed container into a water tank heated to 70° to 95° C for 20 to 60 minutes in order to coagulate the mixture. In the third step, the mixture may be continuously filled into the container while forming said container from a sheet-like material having heat-resistance and water resistance in an aseptic atmosphere, or while blow molding said container from synthetic resin pellets in an aseptic atmosphere, and sealing said container.

BRIEF DESCRIPTION OF THE DRAWING

A more complete appreciation of the invention and many of the attendant advantages thereof will be readily attained as the same becomes better understood by reference to the following detailed description when considered in connection with the accompanying Drawing, wherein.

DETAILED DESCRIPTION OF THE PREFERRED EMBODIMENTS

STEP (1)

Figure 1:
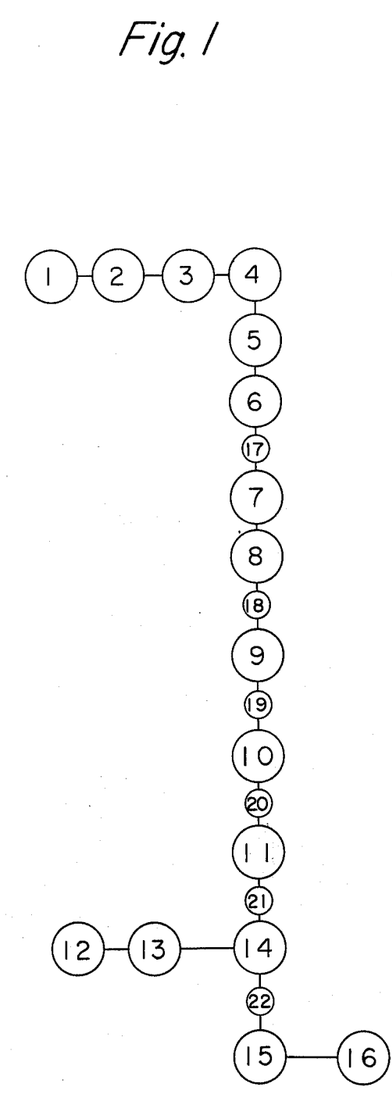
FIG. 1 and FIG. 2 show schematic diagrams of batch and continuous systems, respectively, for manufacture of container-packed, aseptic soya bean curds according to the present invention.
Figure 2:
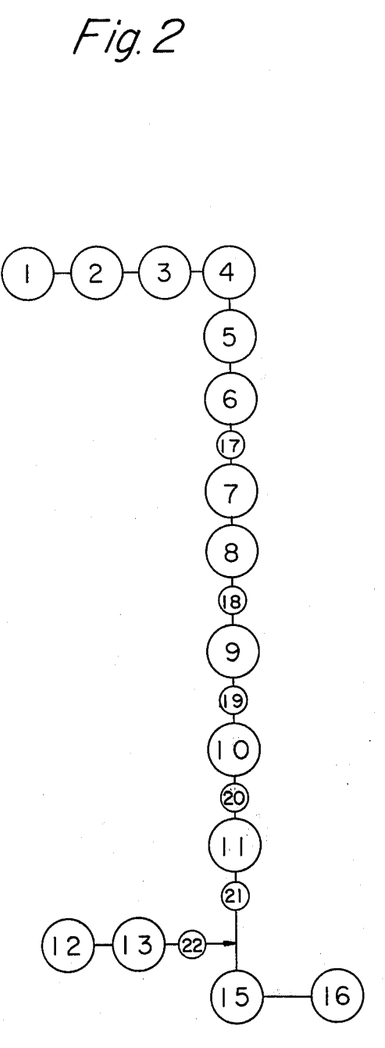

The soya bean juice used in the present invention can be manufactured by any suitable conventional method. In the flow charts of the figure, beans are washed in a washing machine 1, dipped into a soaking tank 2 and ground by a grinder 3. The ground beans are then collected into a receiving tank 4. Subsequently, the ground beans are boiled in a heating vat 5 and wrung by a wringer 6. Fine pieces are removed therefrom by a vibration screen 7 in order to finally obtain a soya bean juice. The soya bean juice is collected in a balance tank 8 and put into a solid content adjusting tank 9 to control the solid content concentration. The soya bean juice so obtained is sterilized at an ultra-high temperature. (Hereinafter, this is referred to as the "UHT treatment". Note that items 17–20 of the figures represent pumps.) The ultra-high temperature of sterilization used for the UHT treatment of cow's milk may be used. Either plate-type heating or indirect heating systems using steam or a direct heating system using culinary steam may be used, depending on the heating conditions desired.

For the plate type heating or indirect heating systems using steam, when the concentration of the solid content of the treated soya bean juice is over 12 wt. %, the curd tends to stick to the surface of the plate or heating surface. When the solid content of the soya bean juice is less than 8 wt. %, the final bean curd product is too soft.

Furthermore, in the case of direct heating by steam, the appropriate concentration of the solid content of the soya bean juice is 8 to 12 wt. %, in view of the desirable quality and cost of the final product. Therefore, when direct or indirect heating is used, the concentration of the solid content of the soya bean juice to be heated should preferably be 8 to 12 wt. %.

Test 1

The following test was performed to determine suitable heating conditions for completely killing the spore-forming bacteria present in a soya bean juice.

22 test samples were prepared by heat treating a soya bean juice (solid content concentration — 10%) obtained by conventional methods, at temperatures of 120°, 128°, 135°, 140°, 145° and 150° C for 1 to 10 seconds using a plate UHT sterilizer (HX made by APV Company or Uperization sterilizer UP 6,000 made by the same company) as shown in Table 1. The treating time was adjusted depending upon the number of plates, the flow velocity, the existence of a by-pass, the steam pressure, the steam volume, the presence of alterations in the holding pipe, etc.

Each heat treated sample was cooled by passage through a cooler and about 50 ml of each sample were collected in a sterilized bottle in an aseptic atmosphere. The samples were subjected to a conventional bacteria inspection wherein the number of colonies of spore-forming bacteria was counted. As shown in Table 1, the rate of survival of the spore-forming bacteria in the samples is indicated using the following symbols: "+": more than 10 colonies per 1 ml of the soya bean juice: "±": 1 to 10 colonies per 1 ml of the soya bean juice, and "−": no measurable colonies per 1 ml of the soya bean juice.

The consistency of the soya bean curd product was also evaluated. It is one of the important properties for consideration in the case of UHT treatment of the soya bean juice since the soya bean protein in the soya bean juice tends to coagulate and produce undesirable effects in the products when the soya bean juice is overheated. Regarding this point, it has been found that the consistency of the soya bean curd is improved when using GDL together with a divalent metallic salt as the coagulating agent-containing solution. The consistency test was performed as follows:

11 soya bean juice samples were subjected to UHT treatment and cooled to room temperature. They were mixed with 10 ml of an aqueous solution of GDL of 25% concentration. The soya bean juice and coagulating agent solution were mixed with sufficient stirring, and thereafter poured into a 200 cc polyethylene container. After tightly closing the container, it was heated at 85° C for 30 minutes in order to coagulate the mixture. Alternatively, it was poured into a 300 cc polyethylene container and, after closure, was heated at 90° C for 40 minutes in order to coagulate the mixture. Immediately after the heat treatment, it was cooled and, after over-night refrigeration, the consistency of the soya bean curd was determined. Additionally, 11 of the soya bean juice used to prepare the sample having a curd tension (measured as described below) of less than 40 was added to and mixed with 10 ml of a coagulating agent solution containing 25% of GDL and 3% of calcium chloride. A soya bean curd was manufactured in the same manner as described above and the consistency was evaluated.

Consistencies were measured at 20° C according to a conventional method using adapter D in a Nakamura type of curd tension meter. The results were evaluated using the following standards:

| Curd tension | |
|---|---|
| above 50 | good |
| 40 to 50 | slightly soft |
| below 40 | too soft, valueless as a commodity |

The results are shown in Table 1.

As is evident from Table 1, suitable UHT treating conditions for completely killing spore-forming bacteria and for making the consistency of the product suitable are 128° C for 2 to 6 seconds, 135° C for 1 to 6 seconds, 140° C for 1 to 6 seconds, 145° C for 1 to 4 seconds, and 150° C for 1 to 2 seconds.

In the process of the present invention, the soya bean juice subjected to sterilization treatment under the above conditions is cooled to room temperature and stored in an aseptic storage tank 11. Thereafter, when the subsequent second step is carried out in a batch system, the required amount of soya bean juice to be treated is transferred to an aseptic mixing tank 14. In the case of a continuous system, it is continuously transferred to a filling machine 15 at a constant flow rate by means of a pump 21.

STEP (2)

In a coagulating agent dissolving tank 12, GDL is dissolved in water to form a solution at 25% concentration. Thereafter, the GDL aqueous solution is sterilized by passage through a millipore membrane filter 13 (made by Japan Millipore, Limited) at a flow rate of about 0.3 to 1l per 1 minute, maintained by about 10 to 30 psi of nitrogen pressure. The filter used preferably has a pore size of 0.2 to 0.45 micrometers. When GDL is used together with a divalent metallic salt as the coagulating agent solution, the divalent metallic salt is added to and mixed with the GDL aqueous solution at a concentration of 1 to 10%, preferably 2 to 7%, of the salt in the final solution. The resulting liquid mixture is passed through a millipore membrane filter to be sterilized in the same manner as described above. Suitable divalent metallic salts for use in this invention include calcium chloride, calcium phosphate, magnesium chloride and the like.

Next, in a batchwise operation, the coagulating agent solution treated in the aseptic atmosphere is poured into an aseptic mixing tank 14 containing the sterilized soya bean juice in the proportion of 0.5 to 2.0% relative to the volume of the soya bean juice. The solution is sufficiently stirred to render it homogeneous. The temperature at mixing is preferably below 20° C in order to avoid the coagulation of the soya bean juice in the Table 1

| Heating temperature | Heating time | | UHT treatment | Survival of Spore forming bacteria | Consistency of bean curd (curd tension) | |
|---|---|---|---|---|---|---|
| | | | | | using GDL only | using GDL and calcium chloride |
| 120° C | 4 | seconds | Plate indirect heating | + | 80 | |
| " | 10 | " | " | ± | 46 | |
| 128° C | 1 | " | " | ± | 78 | |
| " | 2 | " | " | − | 69 | |
| " | 6 | " | " | − | 44 | 53 |
| " | 10 | " | " | − | 28 | 41 |
| 135° C | 1 | " | " | − | 65 | |
| " | 4 | " | " | − | 52 | |
| " | 6 | " | " | − | 40 | 50 |
| " | 8 | " | " | − | 28 | 40 |
| 140° C | 1 | " | " | − | 57 | |
| " | 2 | " | " | − | 50 | |
| " | 4 | " | Steam direct heating | − | 57 | |
| " | 6 | " | " | − | 48 | 60 |
| " | 8 | " | " | − | 36 | 47 |
| " | 6 | " | Plate indirect heating | − | 44 | 56 |
| " | 8 | " | " | − | 33 | 44 |
| 145° C | 1 | " | " | − | 53 | |
| " | 2 | " | Steam direct heating | − | 58 | |
| " | 4 | " | " | − | 42 | 54 |
| " | 6 | " | " | − | 33 | 44 |
| 150° C | 1 | " | " | − | 53 | |
| " | 2 | " | " | − | 45 | 57 |
| " | 3 | " | " | − | 32 | 42 | aseptic mixing tank 14. In continuous operation, the coagulating agent solution is continuously poured into a pipe, in which the sterilized soya bean juice is flowing, by means of a pump 22 in the proportion of 0.5 to 2.0%, by volume, relative to the soya bean juice. The sterilized coagulating agent solution may be added to the sterilized soya bean juice at any point between the pump 21 and the filling machine 15 when the sterilized soya bean juice is cooled to a temperature of below 30° C.

The sterilized coagulating agent solution added to the sterilized soya bean juice attains turbulent flow and is homogeneously and quickly mixed with the soya bean juice flowing in the pipe. When the sterilized soya bean juice and the coagulating agent solution are mixed, baffle plates can be included in the pipe if desired.

Also, a motor or air driven inline-mixer or intermixer (stirring-mixing apparatus) may be used in the mixing.

STEP (3)

This step involves the filling of the aseptic soya bean juice-coagulating agent solution in an aseptic state. One embodiment for this procedure is as follows:

The soya bean juice with the coagulating agent is filled into a container which is formed from a single sheet of a sheet-like material aseptically treated prior to the filling operation.

The sheet-like material preferably is a continuous sheet comprising at least two layers, one being a thick paper coated with wax forming the exterior surface of the container and the other being a layer laminated with polyethylene or the like forming the interior surface of the container. The sheet should be rolled in such a manner that the laminated layer is inside the container. A three-layer-sheet having an aluminum foil between the paper layer and the plastic layer and a four-layer-sheet composed of a wax-coated paper layer, a plastic layer, a non-wax coated paper layer and a plastic layer can also be used. However, these sheet materials must be composed of thermostable and water-resistant materials since the container made from the sheet is heated at a temperature of 70° to 95° C in the subsequent step. The rolled sheet material supplied to aseptic brick filling machine 15 is lifted vertically and passed through a sterilizing vessel containing a heated aqueous solution of hydrogen peroxide in order to effect complete sterilization. The sheet material so sterilized is formed cylindrically in an aseptic chamber and heated at about 200° C from the inside of the cylinder by a high-speed jet of high-temperature air. This removes the hydrogen peroxide and completely dries the sheet.

Next, after heat sealing the lengthwise seam and the bottom of the container, the cylindrically formed sheet material is filled up with the coagulating agent/soya bean juice solution. The filling is carried out in a sufficiently aseptic condition by operating in an aseptic chamber occupied with high-temperature air. Thus, the formation of the container and the filling of the coagulating agent/juice solution are continuously run in succession. The filled container is lifted with opposed jaws below the upper level of the coagulating agent/soya bean juice solution in the container, is heat sealed, and is embossed into a rectangular form.

The chain of rectangles so formed, are cut individually and the protruding portions are folded. In this manner, an aseptic package of a coagulating agent/soya bean juice solution is obtained. A form-seal type of filling machine may also be employed in this process.

Another embodiment is as follows:

Pellets of synthetic resin such as polypropylene and the like are heated to the blow molding temperature, e.g., about 170° C in the case of polyethylene, in order to soften them. Thereafter, they are blow molded into a container with an appropriate volume and shape using aseptic air under a high pressure, for example, about 50 kg/cm² of resin pressure. The molded container so obtained is sealed by heating at the neck. The sealed container is transferred into a filling chamber maintained at a positive pressure with germ-free air. The container is cut at the neck, a prescribed amount of the aseptic soya bean juice is immediately filled therein from the cut opening, and the opening is sealed by heating. Also, a method such as that above in which a container is blow molded in an aseptic atmosphere and is filled with a coagulating agent/soya bean juice solution and then is sealed while still in the mold, is possible. Suitable aforementioned blow molding and filling machines include an aseptic filling machine made by E.P. Remy Petroplastic Company and a bottle packing machine made by Turbo Industry Company. However, in general, any apparatus commercially available for blow manufacturing a soya bean curd may be suitably reconstructed for use so that a container can be blow molded in an aseptic atmosphere and aseptically filled with a coagulating agent soya bean juice solution.

STEP (4)

The container, filled in an aseptic atmosphere and sealed as above, is dipped into a water tank 16 heated to 70° to 90° C for 20 to 60 minutes in order to coagulate the soya bean juice in the container.

The container is of such a nature that it is unaffected by the heat treatment under the above-described heating conditions and is not damaged. The heating condition is sufficient for coagulating the soya bean juice thereby producing the desired product. When the heating temperature is lower than 70° C, the soya bean juice is not sufficiently coagulated. Heating at a temperature of over 95° C is not desired since the product and its flavor are deteriorated by the overheating.

After the heat treatment, the container is allowed to stand at room temperature, or can be cooled.

As indicated above, the manufacture of packaged, truly aseptic soya bean curd is possible only by combining all of the above-described four steps in the prescribed order.

Having generally described the invention, a more complete understanding can be obtained by reference to certain specific examples, which are provided herein for purposes of illustration only and are not intended to be limiting unless otherwise specified.

EXAMPLE 1

720 kg of soya bean grains produced in the U.S.A. were washed, sterilized by dipping for 30 minutes in a 100 ppm sodium hypochlorite solution, and also dipped in flowing water for 12 hours for swelling. The swollen soya beans were ground up with about 3,000 kg of water. The resulting mixture was steamed for 4 minutes at 100° C in a continuously heated vat; all refuse was removed by use of a pressing machine; and other useless particles were removed by use of a vibration screen to yield about 3,600 kg of soya bean juice. The soya bean juice obtained contained 10.4 wt. % of solid content. The soya bean juice was heated for 2 seconds at 135° C by use of an ultra-high temperature sterilizer (UHT Sterilizer Model R-50, made by APV Co.), and cooled to room temperature. After going to an aseptic tank, 3,600l of the resulting soya bean juice were sent through a pipeline to an aseptic brick-filling machine Model AB-500 at a flow rate of 29.7l/min. The germ-free soya bean juice flowing in the pipeline was mixed with 39.6l of a germ-free coagulating agent solution containing 9.90 kg of glucono delta lactone, previously treated by a millipore filter to render it germ-free at a flow rate of 0.3l/min. by use of a positive displacement pump continuously. The two liquids were mixed in the pipeline. The resulting mixture was packed into rectangular containers of 500 ml volume while being shaped by use of the aseptic brick filling machine Model AB-500 made by Japan Tetra Pack Co. in an aseptic atmosphere. The containers were immediately sealed. The containers were constructed from laminated sheets made by laminating a layer of polyethylene, a layer of wax-coated paper, a layer of aluminum foil and a layer of polyethylene, from top to bottom. The container was set up so that the bottom layer of the sheet constituted the inner surface of said container. The containers filled with said soya bean juice were packed into baskets, transferred to a coagulating tank at 85° C, heated for 30 minutes to congeal said soya bean juice in said sealed containers, and released at room temperature. There resulted about 7,200 pieces of germ-free bean curd (500 g) packed in tetra-brick containers.

In the above Example, the second step was performed in a continuous system. The second step was also performed in a batch system, wherein the sterilized soya bean juice was cooled and a part of said juice was stored in an aseptic tank 600l of this soya bean juice were transferred to a germ-free mixing tank, added to 6.0l of a germ-free coagulating agent solution containing 1.5 kg of glucono delta lactone previously treated by a millipore filter to render it germ-free and were mixed homogeneously. Performing the same third and following steps as in the continuous system produced about 1,200 pieces of aseptic soya bean curd packed in similar containers.

After preservation for two months at room temperature, the container-packed germ-free bean curds were found to be germ-free and of good taste.

EXAMPLE 2

Soya bean juice containing 10.4 wt. % of solid content obtained by a similar treatment to that of Example 1, was heated for 2 seconds at 150° C by an ultra-high temperature sterilizer (made by APV Co., Upelizer 6 U 6,000), cooled to room temperature and stored in an aseptic tank. 3,600l of said soya bean juice were sent through a pipe to an aseptic brick filling machine AB-500 at a flow rate of 29.7l/min. To the aseptic soya bean juice flowing in the pipeline was added 39.6l of a germ-free coagulating agent solution containing 9.90 kg of glucono delta lactone previously treated by a millipore filter and 1.164 g of calcium chloride ($CaCl_2 \cdot 2H_2O$) at a continuous flow rate of 0.3l/min., provided by a positive displacement pump. The two liquids were mixed in the pipeline. The resulting mixture was packed in germ-free rectangular parallelopiped containers of 500 ml volume in an aseptic atmosphere by a similar method to that employed in Example 1 and was sealed. Said containers filled with soya bean juice were packed in baskets, transferred to a coagulating tank at 80° C, heated therein for 40 minutes to coagulate said soya bean juice in said containers, and allowed to stand at room temperature. There resulted about 7,200 pieces of aseptic soya bean curd (500 g) packed in tetra-brick containers.

In the above example, the second step was performed in a continuous system. The second step was also performed in a batch system, where sterilized soya bean juice was cooled at room temperature and a part of said juice was stored in an aseptic tank. 600l of this soya bean juice were transferred to an aseptic mixing tank, mixed in an aseptic atmosphere with 6.0l of the germ-free coagulating agent solution containing 1.5 kg of glucono delta lactone and 176 g of calcium chloride ($CaCl_2 \cdot 2H_2O$) previously treated by a millipore filter and homogeneously mixed. The same third and following steps as those employed in the continuous system yielded about 1,200 pieces of similar container-packed aseptic soya bean curds. After preservation for two months at room temperature, said container-packed aseptic soya bean curds were found to be germ-free and of good taste.

EXAMPLE 3

300l of soya bean juice obtained in the same manner as in Example 1 were sent through a pipe to a reconstituted filling machine at a flow rate of 1.5l/min. via an aseptic tank. The aseptic soya bean juice flowing in the pipeline was blended with 3.3l of a germ-free coagulating agent solution containing 0.82 kg of glucono delta lactone, previously treated by a millipore filter, at a flow rate of 15 ml/min. continuously provided by use of a positive displacement pump. The two liquids were mixed in the pipeline. The resulting mixture was packed in a 300 ml germ-free container in an aseptic atmosphere while the container was blow-molded by means of a re-manufactured machine, i.e., a partially reconstructed blow molding machine, 300 R1 made by Unillory Company U.S.A., and immediately sealed. That is, one mold line of the eight series of molding lines of a blow molding machine for cow's milk containers made by Unilloy Company, was reconstructed for a 300 ml rectangular mold container such that the container could be blow-molded by blowing germ-free air treated by an air filter into the mold from an air blowing inlet located in the neck of the mold. This was designed so that immediately after the molding of the container is completed, the coagulating agent/soya bean juice could be filled into the container from another inlet and after the filling operation the container could be heated to seal it. The containers filled with the soya bean juice were packed in baskets, transferred to a coagulating tank at 90° C, heated therein for 40 minutes to coagulate the soya bean juice in the sealed container, and allowed to stand at room temperature to obtain about 900 pieces of aseptic soya bean curd (300 g) packed in blow molded containers.

In this Example, the second step was performed in a continuous system. The second step was also performed in a batch system where sterilized souya bean juice was cooled and a part of the juice was stored in an aseptic tank. 300l of this soya bean juice were transferred to an aseptic mixing tank, blended with 3l of a germ-free coagulating agent solution containing 0.75 kg of glucono delta lactone, previously treated by a millipore filter, and mixed homogeneously. The third and following steps were performed in the same manner as those in the continuous system to obtain about 900 packages of aseptic soya bean curd. After preservation for two months at room temperature, the packaged germ-free bean curds were found to be germ-free and of good taste.

EXAMPLE 4

Soya bean juice containing 10.4 wt. % of solid content, obtained by a similar treatment to that of Example 3, was heated for 2 seconds at 150° C by an ultra-high temperature sterilizer (made by APV Co., Upelizer 6 U 6,000), cooled to room temperature and stored in an aseptic tank. 300l of said soya bean juice were sent through a pipe to a filling machine at a flow rate of 1.5l/min. Germ-free soya bean juice flowing in the pipeline was blended with 3.3l of a germ-free coagulating agent solution containing 0.82 kg of glucono delta lactone and 97 g of calcium chloride ($CaCl_2.2H_2O$), previously treated by a millipore filter, at the flow rate of 15 ml/min. continuously provided by a positive displacement pump. The two liquids were mixed in the pipeline. The resulting mixture was packed in a germ-free blow molded container of 300 ml volume in an aseptic atmosphere by use of a similar re-manufactured machine as that in Example 3 and was sealed. Said containers filled with said soya bean juice were packed in baskets, transferred to a coagulating tank at 90° C, heated therein for 40 minutes to coagulate said soya bean juice in said containers, and allowed to stand at room temperature. There resulted about 900 pieces of aseptic soya bean curd (300 g) packed in blow molded containers.

In the above example, the second step was performed in a continuous system. The second step was also performed in a batch system, where sterilized soya bean juice was cooled and a part of said juice was stored in an aseptic tank. 300l of this soya bean juice were transferred to an aseptic mixing tank, blended in an aseptic atmosphere with 3.0l of a germ-free coagulating agent solution containing 0.75 kg of glucono delta lactone and 88 g of calcium chloride ($CaCl_2.2H_2O$), previously treated by a millipore filter, and mixed homogeneously. The same third and following steps as those employed in the continuous system gave about 900 pieces of similar container-packed aseptic soya bean curds. After preservation for two months at room temperature, said container-packed aseptic soya bean curds were found to be germ-free and of good taste.

As described hereinbefore, germ-free bean curds prepared according to the process of the present invention have excellent advantages in that said germ-free bean curds have good taste and flavor, are stable in their quality and can be preserved for a long period at room temperature, as will be described in detail hereinafter.

One of the greatest advantages achieved by the process of the present invention resides in the fact that bean curds capable of being preserved for a long period at room temperature are prepared without use of any bactericidal agents, increasing their merchandise value enormously. This is obviously shown by the results of Tests 2 and 3 below, where germ-free bean curds, prepared according to the process of the present invention, were compared with conventional bean curds (commercial blow bean curds) as to their taste and flavor, as well as to the number of bacteria present after preservation at room temperature.

Test 2

500 pieces of bean curds prepared by processes similar to thos in Example 1 and Example 2 were designated as Sample No. 1 and Sample No. 2, respectively.

To make a comparative test, 10 pieces of soya bean curds in blow molded containers made by two different commercial companies were purchased. The products of both companies were produced 2 days prior to the test as indicated by the production date coded on the wrapper. These 2 days were included in the preservation tests below. These commercial products were designated as Sample No. 3 and Sample No. 4, respectively. Sample No. 5 in Table 2 was prepared as follows: 1.2 kg of soya bean juice, prepared by the same process as that in Example 1 but not heated by an ultra-high temperature sterilizer, were added to 12 g of a glucono delta lactone solution containing 3 g of glucono delta lactone at room temperature, were mixed homogeneously, packed in polyethylene containers, sealed, coagulated by heating for 30 minutes at 85° C and cooled. The resulting products were not treated with any bactericidal agent. Sample No. 6 was prepared by heating a soya bean juice, prepared by the same process as that in Example 1, for 2 seconds at 135° C, and using the same process as that of Sample No. 5. All products in Sample No. 6 included no bactericidal agent.

Portions of Samples Nos. 1 – 6 were preserved at room temperature (23° – 27° C) for periods of 3 days, 7 days, 1 month, 2 months and 3 months and were tested as to their number of bacteria as well as their flavor and taste at the end of each period. The test on Samples No. 1 and No. 2 was performed as follows: All samples were examined as to their appearances. 100 pieces were randomly selected, among which 10 pieces were selected randomly, from which the number of bacteria was determined. The remaining 90 pieces were analyzed immediately as to their flavor and taste. When any one piece was found to taste unusual, the piece was submitted to a determination of the number of bacteria.

Each test on Samples Nos. 3 – 6 was performed as follows:

2 pieces were randomly selected, and examined as to their appearance. One piece was sampled to be submitted to the determination of the number of bacteria, the other piece was examined as to its flavor and taste.

The determination of the number of bacteria was performed in the same way as in Test 1. Organoleptic tests on flavor and taste were performed by a group of 15. The flavor and taste of the bean curds of each sample were compared with those of commercial soya bean curds 2 – 3 days after production, using a two point comparison method. It should be mentioned that the judgments on flavor and taste included in Table 2 are unanimous judgments of more than 12 judges. The results of said tests are shown in Table 2.

Table 2

| No. | Sample | Test Items | Periods of Preservation — 3 Days at Room Temperature |
|---|---|---|---|
| 1 | Germfree bean curds prepared as in Example 1 of the present invention | Appearance<br>Number of bacteria<br>Flavour and Taste | all normal<br>0 in all 10 pieces<br>all normal |
| 2 | Germfree bean curds prepared as in Example 2 of the present invention | Appearance<br>Number of bacteria<br>Flavour and Taste | all normal<br>0 in all 10 pieces<br>all normal |
| 3 | Blow bean curds in market by A Co. (with bactericidal agent) | Appearance<br>Number of bacteria<br>Flavour and Taste | both pieces normal<br>3    12<br>both pieces normal |
| 4 | Blow bean curds in market by B Co. (with bactericidal agent) | Appearance<br>Number of bacteria<br>Flavour and Taste | both pieces normal<br>0    8<br>both pieces normal |
| 5 | Bean curds made by the conventional process (without bactericidal agent) | Appearance<br>Number of bacteria<br>Flavour and Taste | both pieces normal<br>$44 \times 10^3$  $12 \times 10^4$<br>both pieces acid a little |
| 6 | Bean curds made by the conventional process after UHT treatment (without bactericidal agent) | Appearance<br>Number of bacteria<br>Flavour and Taste | both pieces normal<br>0    2<br>both pieces normal |

| No. | 7 Days at Room Temperature | 1 Month at Room Temperature | 2 Months at Room Temperature | 3 Months at Room Temperature |
|---|---|---|---|---|
| 1 | all normal<br>0 in all 10<br>all normal | all normal<br>0 in all 10<br>all normal | all normal<br>0 in all 10<br>all normal | all normal<br>0 in all 10<br>a little stale |
| 2 | all normal<br>0 in all 10<br>all normal | all normal<br>0 in all 10<br>all normal | all normal<br>0 in all 10<br>all normal | all normal<br>0 in all 10<br>a little stale |
| 3 | both normal<br>12    8<br>both normal | gas swelling ; normal<br>$55 \times 10^5$  $28 \times 10^2$<br>acid ;   normal | both gas swelling<br>$58 \times 10^8$  $12 \times 10^8$<br>both not fit for food | |
| 4 | both normal<br>320    22<br>both normal | normal ; turbid water oozing<br>$72 \times 10^3$  $26 \times 10^7$<br>a little acid, not specifically abnormal   not fit for food | both gas swelling<br>$11 \times 10^8$  $72 \times 10^7$<br>not fit putrid   for food | |
| 5 | both swelling with gas<br>$18 \times 10^8$  $33 \times 10^8$<br>both not fit for food | | | |
| 6 | both normal<br>$29 \times 10^2$  $38 \times 10^3$<br>normal ;  a little stale | both gas swelling<br>$42 \times 10^5$  $87 \times 10^5$<br>not fit  putrid for food | | |

Test 3

500 pieces of bean curds prepared by processes similar to those in Example 3 and Example 4 were designated as Sample No. 1 and Sample No. 2, respectively.

To make a comparative test, 10 pieces of soya bean curds in blow molded containers without addition of any bactericidal agent made commercially by two different companies were purchased. The products of both companies were found to have been produced the day before purchase by their indicated dates of production. This was accounted for in the tests. These products were designated as Sample No. 3 and Sample No. 4, respectively.

Sample No. 5 in Table 3 was prepared by adding 12 g of glucono delta lactone solution containing 3 g of GDL to 1.2 kg of soya bean juice obtained by the same process as in Example 3. It was UHT-heat treated at 135° C for 2 seconds, cooled at room temperature and mixed homogeneously, filled into a 300 ml polyethylene blow up molded container and sealed. Thereafter, it was heated at 90° C for 40 minutes to coagulate the product and then was cooled. The product was treated with no bactericidal agent.

Samples Nos. 1 – 5 were preserved at room temperature (21°–25° C) for periods of 3 days, 7 days, 1 month, 2 months and 3 months and were tested to the number of bacteria as well as the flavor and taste at the end of each period. Each test on samples No. 1 and No. 2 was performed as follows: All samples were examined as to their appearances. 100 pieces were randomly selected, among which 10 pieces were selected randomly, and the number of bacteria was determined. The remaining 90 pieces were studied immediately as to their flavor and taste. When any one piece was found to taste unusual, the piece was submitted to a determination of the number of bacteria.

Each test on Samples Nos. 3 – 5 was performed as follows: Two pieces were randomly selected, and examined as to their appearance. One piece sampled was submitted to the determination of the number of bacteria, the other piece was examined as to its flavor and taste.

The determination of the number of bacteria was performed in the same way as in Test 1. Organoleptic tests on flavor and taste were performed by a group of 15. The flavor and taste of the bean curds of each sample were compared by a pair test with those of commercial bean curds 2 – 3 days after production. It is to be mentioned that the judgments on flavor and taste described in Table 3 are the unanimous judgements of more than 12 judges. The results of said tests are shown in Table 3.

Table 3

| No. | Sample | Test Items | Periods of Preservation | 3 days at Room Temperature |
|---|---|---|---|---|
| 1 | Germfree bean curds prepared as in Example 3 of the present invention | Appearance | | all normal |
| | | Number of bacteria | | 0 in all 10 pieces |
| | | Flavour and Taste | | all normal |
| 2 | Germfree bean curds prepared as in Example 4 of the present invention | Appearance | | all normal |
| | | Number of bacteria | | 0 in all 10 pieces |
| | | Flavour and Taste | | all normal |
| 3 | Blow bean curds in market by A Co. | Appearance | | both swelling with gas |
| | | Number of bacteria | | $49 \times 10^8$  $33 \times 10^8$ |
| | | Flavour and Taste | | both not fit for food |
| 4 | Blow bean curds in market by B Co. | Appearance | | both swelling with gas |
| | | Number of bacteria | | $63 \times 10^8$  $40 \times 10^8$ |
| | | Flavour and Taste | | both not fit for food |
| 5 | Bean curds made by the conventional process after UHT treatment (without bactericidal agent) | Appearance | | both pieces normal |
| | | Number of bacteria | | 0   3 |
| | | Flavour and Taste | | both pieces normal |

| No. | 7 Days at Room Temperature | 1 Month at Room Temperature | 2 Months at Room Temperature | 3 Months at Room Temperature |
|---|---|---|---|---|
| 1 | all normal | all normal | all normal | all normal |
| | 0 in all 10 | 0 in all 10 | 0 in all 10 | 0 in all 10 |
| | all normal | all normal | all normal | a little stale |
| 2 | all normal | all normal | all normal | all normal |
| | 0 in all 10 | 0 in all 10 | 0 in all 10 | 0 in all 10 |
| | all normal | all normal | all normal | a little stale |
| 3 | | | | |
| 4 | | | | |
| 5 | both normal | both gas swelling | | |
| | $25 \times 10^2$  $84 \times 10^2$ | $39 \times 10^5$  $80 \times 10^5$ | | |
| | normal ; a little stale | not fit putrid for food | | |

As obviously can be seen from the data shown in Tables 2 and 3, container-packed aseptic soya bean curds prepared by the process of the present invention have the same food value after preservation at room temperature for a period short of 2 months as a commercial product has at the time of production. They show a slight deterioration in their flavor and taste after 3 months. In contrast with this, commercial bean curds with the addition of a sterilizing bactericidal agent showed no significant deterioration in their quality up to 7 days when preserved at room temperature. However, preservation for 1 month at room temperature completely eliminated the freshness of their flavor and taste, and increased the acidity. After preservation for 2 months at room temperature, visual deterioration of the products could be observed because of the growth of spore-forming bacteria. This is due to the fact that the bactericidal agents, contained in said commercial soya bean curds in order to suppress the growth of spores by virtue of bacteriostatic action, remain active for a given period of time only, losing their power with the lapse of time, enabling the growth of said spore-forming bacteria.

On the other hand, the blow molded soya bean curds of Sample No. 5 in Table 2, prepared by the present inventors according to the conventional process without addition of any bactericidal agents, showed a low number of bacteria and a good taste immediately after production. However, after preservation for 3 days at room temperature, the number of bacteria was up to 44 × $10^3$/g and 12 × $10^4$/g, and a slight acidity was present, yielding a commercially unacceptable product. Similarly, Sample No. 6 was found to suffer a deterioration in its flavor and taste after preservation for 7 days at room temperature. It totally lost its merchandise value after preservation for 1 month at room temperature. Further, both pieces of each of the commercial bean curds, made without addition of bactericidal agent, were expanded by gas and suffered an increase in the number of bacteria so that they became unsuitable for use as food after the third day when preserved at room temperature.

On the other hand, blow molded soya bean curds (No. 5 in Table 3) prepared in a non-aseptic atmosphere by adding a coagulating agent solution which was not aseptically treated to a sterilized soya bean juice and using commercial blow molding and filling machines, were low in the number of bacteria and good in flavor immediately ater their preparation. However, the number of bacteria increased to 25 × $10^2$/g and 84 × $10^2$/g after preservation at room temperature for 7 days and one of them deteriorated somewhat in flavor and was not acceptable as food. They completely lost their merchandise value after preservation at room temperature for 1 month. As is evident from this result, a packaged, truly aseptic soya bean curd cannot be obtained by sterilization treatment of soya bean juice alone.

Compared with the conventional soya bean curds which maintain their quality by suppressing the growth of spore-forming bacteria by use of bactericidal agents, soya bean curds prepared by the process of the present invention show no defect in their quality after preservation at room temperature for a period as long as two months. The aseptic soya bean curd obtained by the process of the present invention is equal to or better than the conventional product not only in taste but also in consistency, which is an important characteristic of soya bean curd, as well as in the homogeneity of the coagulated material and palatability, etc.

However, in the present invention, when continuous mixing of the germ-free coagulating agent solution and the sterilized soya bean juice in a pipeline is employed, the manufacturing cost is greatly lowered, since a packaged, aseptic soya bean curd can then be continuously manufactured for the first time.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of manufacturing a packaged, aseptic soya bean curd without inclusion of any bactericidal agent, which comprises:
   continuously sterilizing a soya bean juice by maintaining it at a temperature of 135° C for 2 seconds by use of an ultra-high temperature sterilizer and cooling to room temperature;
   flowing the resultant juice through a pipeline to an aseptic brick filling machine in which pipeline it is homogeneously mixed with from 0.5 to 2 volume percent of a coagulating agent of glucono delta lactone and a divalent metal salt;
   continuously filling the resulting liquid mixture into a container in an aseptic atmosphere and sealing it; and
   dipping said sealed container into a water tank heated to 70° to 95° C for 20 to 60 minutes in order to coagulate the mixture.

2. A method of manufacturing a packaged, aseptic soya bean curd without incusion of any bactericidal agent, which comprises:
   continuously sterilizing a soya bean juice by maintaining it at a temperature of 128° to 150° C for 1 to 6 seconds and cooling to room temperature;
   homogeneously mixing said sterilized soya bean juice with a glucono-delta-lactone solution which has been sterilized by passage through a bacterial filter in an aseptic atmosphere;
   continuously filling the resulting liquid mixture in an aseptic atmosphere into a container continuously formed by heat-sealing the lengthwise seam and the bottom of the container in an aseptic atmosphere frm a multi-layer sheet having heat resistance and water resistance and sealing it; and
   dipping said sealed container into a water tank heated to 70° to 95° for 20 to 60 minutes in order to coagulate the mixture.

3. The method of claim 2, wherein said sterilized glucono-delta-lactone containing solution further comprises a divalent metal salt selected from the group consisting of calcium chloride, calcium phosphate or magnesium chloride.

4. The method of claim 2, wherein the homogeneous mixing of the soya bean juice and the glucono-delta-lactone containing solution is performed continuously in a pipeline.

5. A method of manufacting a packaged, aseptic soya bean curd without inclusion of any bactericidal agent, which comprises:
   continuously sterilizing a soya bean juice by maintaining it at a temperature of 128° to 150° C for 1 to 6 seconds and cooling to room temperature;
   homogeneously mixing said sterilized soya bean juice with a glucono-delta-lactone solution which has been sterilized by passage through a bacterial filter in an aseptic atmosphere;
   continuously filling the resulting liquid mixture in an aseptic atmosphere from a plastic pellet and sealing it; and
   dipping said sealed container into a water tank heated to 70° to 95° C for 20 to 60 minutes in order to coagulate the mixture.

6. The method of claim 5, wherein said sterilized glucono-delta-lactone containing solution further comprises a divalent metal salt selected from the group consisting of calcium chloride, calcium phosphate or magnesium chloride.

7. The method of claim 5, wherein the homogeneous mixing of the soya bean juice and the glucono-delta-lactone containing solution is performed continuously in a pipeline.

8. A method of manufacturing a packaged, aseptic soya bean curd without inclusion of any bactericidal agent, which comprises:

continuously sterilizing a soya bean juice by maintaining it at a temperture of 128° to 150° C for 1 to 6 seconds and cooling to room temperature;

homogeneously mixing said sterilizing soya bean juice with a glucose-delta-lactone solution which has been sterilized by passage through a bacterial filter in an aseptic atmosphere;

continuously filling the resulting liquid mixture in an aseptic atmosphere into a container continuously formed from a plastic film by applying vacuum or air pressure to the mold cavity in an aseptic atmosphere and sealing it; and dipping said sealed container into a water tank heated to 70° to 95° C for 20 to 60 minutes in order to coagulate the mixture.

9. The method of claim 8, wherein said sterilized glucono-delta-lactone containing solution further comprises a divalent metal salt selected from the group consisting of calcium chloride, calcium phosphate or magnesium chloride.

10. The method of claim 8, wherein the homogeneous mixing of the soya bean juice and the glucono-delta-lactone containing solution is performed continuously in a pipeline.

11. A packaged, aseptic soya bean curd charcterized by containing no bacteriocidal agent and by long shelf life of at least 3 months at room temperature prepared by the method which comprises:

continuously sterilizing a soya bean juice by maintaining it at a temperature of 128° to 150° C for 1 to 6 seconds and cooling to room temperature;

homogeneously mixing said sterilized soya bean juice with a glucono-delta-lactone solution which has been sterilized by passage through a bacterial filter in an aseptic atmosphere;

continuously filling the resulting liquid mixture in an aseptic atmosphere into a container continuously formed by heat-sealing the lengthwise seam and the bottom of the container in an aseptic atmosphere from a multilayer sheet having heat resistance and water resistance and sealing it; and dipping said sealed container into a water tank heated to 70° to 95° C for 20 to 60 minutes in order to coagulate the mixture.

12. A packaged, aseptic soya bean curd characterized by containing no bacteriocidal agent and by long shelf life of at least 3 months at room temperature prepared by the method which comprises:

continuously sterilizing a soya bean juice by maintaning it at a temperature of 128° to 150° C for 1 to 6 seconds and cooling to room temperature;

homogeneously mixing said sterilized soya bean juice with a glucono-delta-lactone solution which has been sterilized by passage through a bacterial filter in an aseptic atmosphere;

continuously filling the resulting liquid mixture in an aseptic atmosphere into a container continuously formed by blow molding in an aseptic atmosphere from a plastic pellet and sealing it; and dipping said sealed container into a water tank heated to 70° to 95° for 20 to 60 minutes in order to coagulate the mixture.

13. A packaged, aseptic soya bean curd characterized by containing no bacteriocidal agent and by long shelf life of at least 3 months at room temperature prepared by the method which comprises:

continuously sterilizing a soya bean juice by maintaining it at a temperature of 128° to 150° C for 1 to 6 seconds and cooling to room temperature;

homogeneously mixing said sterilized soya bean juice with a glucose-delta-lactone solution which has been sterilized by passage through a bacterial filter in an aseptic atmosphere;

continuously filling the resulting liquid mixture in an aseptic atmosphere into a container continuously formed from a plastic film by applying vacuum or air pressure to the mold cavity in an aseptic atmosphere and sealing it; and dipping said sealed container into a water tank heated to 70° to 95° C for 20 to 60 minutes in order to coagulate the mixture.

* * * * *